Patented Apr. 5, 1949

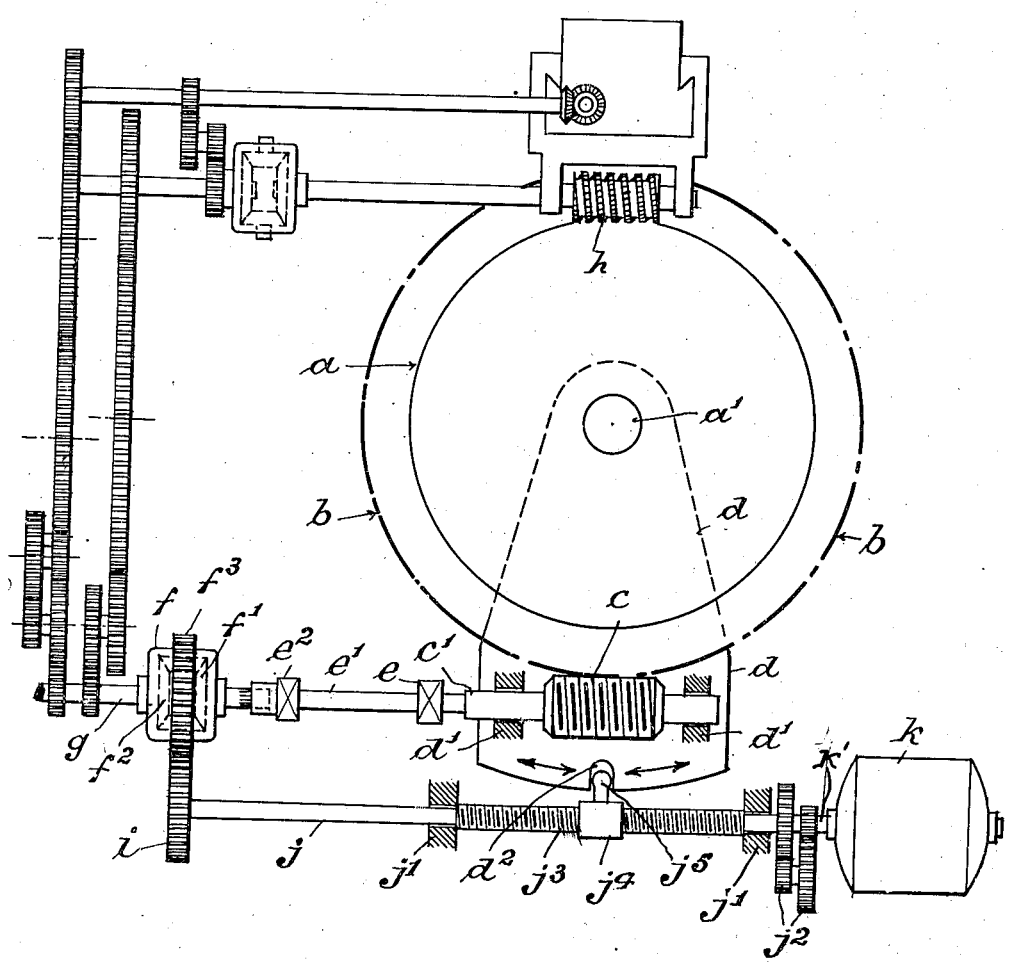

2,466,512

UNITED STATES PATENT OFFICE 2,466,512

GEAR HOBBING OR LIKE MACHINE PROVIDED WITH ROTARY WORKTABLE

Arthur Sykes and William Alfred Tuplin, Huddersfield, England, assignors to David Brown & Sons (Huddersfield), Limited, Huddersfield, England Application October 25, 1946, Serial No. 705,752
In Great Britain October 30, 1945

2 Claims. (Cl. 90—4)

The invention relates to machines, for cutting the teeth of gears by hobbing or other generating processes, in which rotary worktables are employed.

In such a machine, the worktable usually carries a gear wheel the axis of which is coincident with that of the table, and with this gear there meshes a driving gear.

Departures from uniformity of relative motion of the table and the driving gear often recur in cycles, each corresponding to a rotation of the table through an angle equal to one revolution divided by the number of teeth in the table gear.

If the pitch point of engagement of the table gear and driving gear has a constant displacement angularly about the axis of the table from the pitch point of engagement of the hob and the work, there are produced on the teeth of the work recurrent errors in the form of a series of surface irregularities disposed on lines lying parallel to the axis of the work, there being one such line for each tooth in the table gear. These surface irregularities on the teeth of the work affect seriously the running of the work when meshed with a mating gear.

The production of these "straight-line" irregularities can be avoided, it is known, by so constructing the machine that the pitch point of engagement of the table gear and its driving gear is not stationary in relation to the pitch point of engagement of the hob and the work but "creeps," as it is termed, in some predetermined manner.

According to known devices, the driving gear is arranged either to "creep" round the table gear indefinitely or to move through only a few degrees of angle whilst the hob traverses the face of the work. In both cases the surface irregularities are distributed along helices.

It can be demonstrated that the pattern formed on the teeth of the work is, or can be, influenced considerably by small changes in the rate of "creep," but the calculation of the pattern which may be produced by a given rate is tedious and awkward and is, moreover, dependent upon assumptions which cannot always be justified. It is an object, therefore, of the present invention to provide "creep" mechanism in which the rate of "creep" can be varied at will whilst the cutting operation is in progress. By this means it becomes easily possible, by appropriate trial, to determine or provide a "creep" ratio which gives an acceptable pattern to the surface irregularities produced.

A further object of the invention is to avoid the distribution of the surface irregularities on straight lines or on helices, but instead to give to them a wave-like distribution which will permit of their being readily corrected by the well-known crossed-axis shaving process.

The invention is characterised in that, instead of giving to the driving gear a "creep" motion in one direction only it is given a reciprocatory motion between predetermined limits. The reciprocation may or may not follow a regular cycle and it may be either in a circular arc or in a staight line tangential to such an arc, or it may follow any suitable curve other than an arc.

Compensation for the movement of the pitch-point of engagement of the table gear and its driving gear is effected by appropriate modification of the rotation of the driving gear by means of a differential gear assembly or its equivalent.

The drive for the "creep" mechanism may be taken from the main drive of the machine or it may be supplied by a separate motor. The latter arrangement will preferably be adopted, employing a variable-speed, reversible motor with appropriate means for effecting reversal according to the amplitude of reciprocating "creep" desired. The employment of a driving arrangement such as just described facilitates alteration in the rate of "creep" whilst cutting is in progress without affecting the essential relation between the rotation of the hob and the rotation of the work.

In order that the invention may be clearly understood I have appended hereto a drawing showing in more or less diagrammatic form an embodiment of the same.

In this drawing $a$ represents a gear blank mounted on a rotary table, not shown, carried by a rotatable shaft $a'$ adapted to be driven by a worm wheel $b$ receiving motion from a worm $c$, the shaft $c'$ of which is journalled in bearings $d'$, $d'$, on a cradle $d$ pivotal about the shaft $a'$ carrying the worktable. By means of a universal joint $e$, connecting shaft $e'$, and a universal joint $e^2$, the worm shaft $c'$ is connected with one sun wheel $f'$ of a differential mechanism $f$ the other sun wheel $f^2$ of which is carried by a shaft $g$ driven from any convenient source at an appropriate speed relative to that of the rotation of the hob $h$ by which teeth are to be cut in the blank $a$.

The hob $h$ may be driven and fed by any suitable arrangement of gearing from or correlated to the shaft $g$.

The casing of the differential mechanism $f$ carries a toothed gear $f^3$ which meshes with a toothed gear $i$ on a shaft $j$ journalled in suitable fixed bearings $j'$, $j'$ and connected through reduction gearing $j^2$ with the shaft $k'$ of a variable-speed, reversing motor $k$. A portion $j^3$ of the shaft $j$ is screw-threaded and has working upon it a nut member $j^4$ having a projection $j^5$ which engages in a recess $d^2$ in the cradle $d$ carrying the table-driving worm $c$. Thus, axial travel of the nut member $j^4$ causes a pivotal movement of the cradle $d$ in the same direction about the axis of the work table.

Suitable limit switches or their equivalent may determine the amplitude of reciprocation of the cradle $d$ and variation in the speed of the motor $k$ causes a corresponding variation in the rate of "creep" given to the gear blank.

The "creep" motion provided according to the invention operates quite independently of the table drive. The relation between the rotation of the work-piece and that of the hob remains constant, since automatic compensation is made for the changes which take place in the position of the pitch point of engagement of the worm $c$ with the table-gear $b$. Stoppage of the "creep" motion, or its alteration to vary the rate of "creep" whilst cutting is proceeding do not, therefore, affect the work table drive or its relation to the rotation of the hob.

Having thus described our invention, what we do claim as new and desire to secure by Letters Patent is:

1. A machine for cutting gear teeth by a generating process, comprising in combination, a rotary work table carrying the blank to be cut; a rotating generating tool operating on said blank; a worm wheel rotatable about the axis of said work table and adapted to drive the same; a cradle pivotal about the axis of the worm wheel; a worm meshing with said worm wheel; a shaft forming part of said worm; bearings for the latter shaft carried by said cradle; a differential mechanism having a casing; a first sun wheel forming part of said differential mechanism; a universal joint connection between said first sun wheel and said worm shaft; a second sun wheel forming part of said differential mechanism; a connection between said second sun wheel and said generating tool for transmitting speed to the latter at a determined ratio; a toothed gear carried by said casing of the differential mechanism; a variable-speed reversing motor; means connecting said motor and said toothed gear; an exteriorly threaded shaft portion forming part of said latter connecting means; a nut engaged on said threaded shaft portion; a recess provided in said cradle; a projection carried by said nut for engaging said recess; and means for affecting reversals of said reversing motor and for determining thereby the amplitude of reciprocation of said worm.

2. A machine for cutting gear teeth by a generating process, comprising in combination, a rotary work table carrying the blank to be cut; a rotating generating tool operating on said blank; a worm wheel rotatable about the axis of said work table and adapted to drive the same; a cradle pivotal about the axis of the worm wheel; a worm meshing with said worm wheel; a shaft forming part of said worm; bearings for the latter shaft carried by said cradle; a differential mechanism having a casing; a first sun wheel forming part of said differential mechanism; a universal joint connection between said first sun wheel and said worm shaft; a second sun wheel forming part of said differential mechanism; a connection between said second sun wheel and said generating tool for transmitting speed to the latter at a determined ratio; a toothed gear carried by said casing of the differential mechanism; a variable-speed reversing motor; a drive shaft; fixed bearings for said drive shaft; a reduction gearing interposed between said drive shaft and said motor; a gear provided on said drive shaft for engagement of said toothed gear; a threaded portion provided on the exterior of said drive shaft; a nut engaged on said threaded shaft portion; a recess provided in said cradle; a projection carried by said nut for engaging said recess; and means for effecting reversals of said reversing motor and for determining thereby the amplitude of reciprocation of said worm.

ARTHUR SYKES.
W. ALFRED TUPLIN.

REFERENCES CITED

The following references are of record in the file of this patent:

UNITED STATES PATENTS

| Number | Name | Date |
|---|---|---|
| 2,098,132 | Buchholz | Nov. 2, 1937 |

FOREIGN PATENTS

| Number | Country | Date |
|---|---|---|
| 484,928 | Great Britain | May 12, 1938 |